US012800448B2

(12) United States Patent
Marteleur et al.

(10) Patent No.: US 12,800,448 B2
(45) Date of Patent: Nov. 17, 2026

(54) TISSUE DISAGGREGATION

(71) Applicant: BIOSAFE S.A., Grens (CH)

(72) Inventors: Klas Marteleur, Uppsala (SE); Devina Divekar, Histon (GB)

(73) Assignee: BIOSAFE S.A., Grens (CH)

( * ) Notice: Subject to any disclaimer, the term of this patent is extended or adjusted under 35 U.S.C. 154(b) by 715 days.

(21) Appl. No.: 18/248,806

(22) PCT Filed: Oct. 20, 2021

(86) PCT No.: PCT/EP2021/079070
§ 371 (c)(1),
(2) Date: Apr. 12, 2023

(87) PCT Pub. No.: WO2022/090021
PCT Pub. Date: May 5, 2022

(65) Prior Publication Data
US 2023/0417638 A1 Dec. 28, 2023

(30) Foreign Application Priority Data
Oct. 27, 2020 (GB) ..................................... 2017038

(51) Int. Cl.
*G01N 1/00* (2006.01)
*A01N 1/144* (2025.01)
*G01N 1/28* (2006.01)

(52) U.S. Cl.
CPC ............. *G01N 1/286* (2013.01); *A01N 1/144* (2025.01)

(58) Field of Classification Search
None
See application file for complete search history.

(56) References Cited

U.S. PATENT DOCUMENTS 8,790,597 B2 * 7/2014 Childs ............... B29C 66/53262 422/65

FOREIGN PATENT DOCUMENTS

EP 0968760 A1 1/2000
EP 3072953 A1 9/2016
WO 2015076115 A1 5/2015
WO 2020177920 A2 9/2020

OTHER PUBLICATIONS

PCT International Search Report and Written Opinion for PCT/EP2021/079070, mailed Jan. 14, 2022 (11 pages).
GB Search Report for Application No. 2017038.7, mailed Jul. 1, 2021 (3 pages).

* cited by examiner

*Primary Examiner* — Jyoti Mutreja
(74) *Attorney, Agent, or Firm* — Eversheds-Sutherland (US) LLP

(57) ABSTRACT

The present invention relates to a sample processing bag (10) for use in a tissue disaggregation apparatus (200) for disaggregation of tissue therein. A clamp assembly 60 comprising a base support (70) and a clamp mechanism (72) is configured to retain the sample processing bag (10) adjacent to the base support (70) during a tissue disaggregation operation such that action of the tissue disaggregation apparatus 200 acts on the sample processing bag (10) to disaggregate any tissue therein.

19 Claims, 4 Drawing Sheets

TISSUE DISAGGREGATION

CROSS REFERENCE TO RELATED APPLICATIONS

This application claims the priority benefit of PCT/EP2021/079070, filed Oct. 20, 2021, which claims the priority benefit to GB Application No. 2017038.7, filed Oct. 27, 2020, the entire contents of which are incorporated herein by reference.

TECHNICAL FIELD

The present invention relates generally to use of improved components and methods for disaggregation of tissue samples in a closed volume.

BACKGROUND

In many areas of medicine and biology there is a need to take tissue samples and disaggregate them into cell clumps and single cells for further processing. The number of applications therefor is large and may include extraction of cells, for example:

a) "Primary cells" may be extracted from tissue such as liver, which can be then used in various assays commonly called high throughput screening and downstream applications such as single cell sequencing and flow cytometry;

b) Tissue Infiltrating Lymphocytes (TIL) may be extracted from tumour tissue and used as the basis for an autologous cell therapy;

c) Cord tissue may be used to extract mesenchymal stromal cells;

d) Tumours may be excised and their cells analysed for "neoantigen"; and e) Tissue may be dislocated and cells can be examined, whereby the so-called multi-omics of cells (e.g. proteomics, genomics, epigenomics) may be investigated for many purposes including personalised medicines.

In many applications it is desirable to maintain as many healthy cells as possible, and to keep them in a clean, sterile condition. In this application closed, aseptic, sterile and like terms are intended to mean the condition whereby biological material is separated from its surroundings, but not necessarily wholly free of a bioburden or other contamination, merely free enough that such bioburden or other contamination, if any, does not have a significant influence on the viability or usability of the material which is disaggregated.

One technique for tissue disaggregation of cells is known from WO 2018/130845. Also known is U.S. Pat. No. 6,439,759 which describes a kneading device which includes an internal baffle to aid mixing a closed bag of materials, without thermal control in this arrangement being considered.

In order to address shortcomings of the aforementioned prior art, WO 2020/177920 has also been developed in order to disaggregate cells taking into account more parameters than had previously been considered, and to improve the performance of the disaggregation, freezing and thawing processes.

For the avoidance of doubt, the content of all of the previously mentioned documents WO 2018/130845, U.S. Pat. No. 6,439,759 and WO 2020/177920 is hereby also incorporated by reference in its entirety herein to the maximum permissible extent.

However various shortcomings of the prior art still exist, particularly with regard to the need to simultaneously process multiple tissue samples under substantially the same processing conditions so to provide comparable samples for further analysis.

Hence the present invention, as defined by the appended claims, is provided.

SUMMARY OF INVENTION

The present invention thus provides, inter alia, a sample processing bag for use in a treading device apparatus, for disaggregation of tissue therein, comprising at least one foot assembly for treading the sample processing bag and a clamp assembly that is releasably couplable to the treading device apparatus. The clamp assembly comprises a base support and a clamp mechanism together configured to retain the sample processing bag adjacent to the base support during a tissue disaggregation operation, such that the at least one foot assembly acts on the sample processing bag to disaggregate any tissue therein.

By providing such a clamp assembly and sample processing bag, various embodiments of the present invention facilitate improved ease of handling of, for example, multiple separate samples and their subsequent dissociation and processing under substantially identical conditions.

DRAWINGS

The present invention will now be described in more detail with reference to the appended drawings, in which.

DETAILED DESCRIPTION

Figure 1:
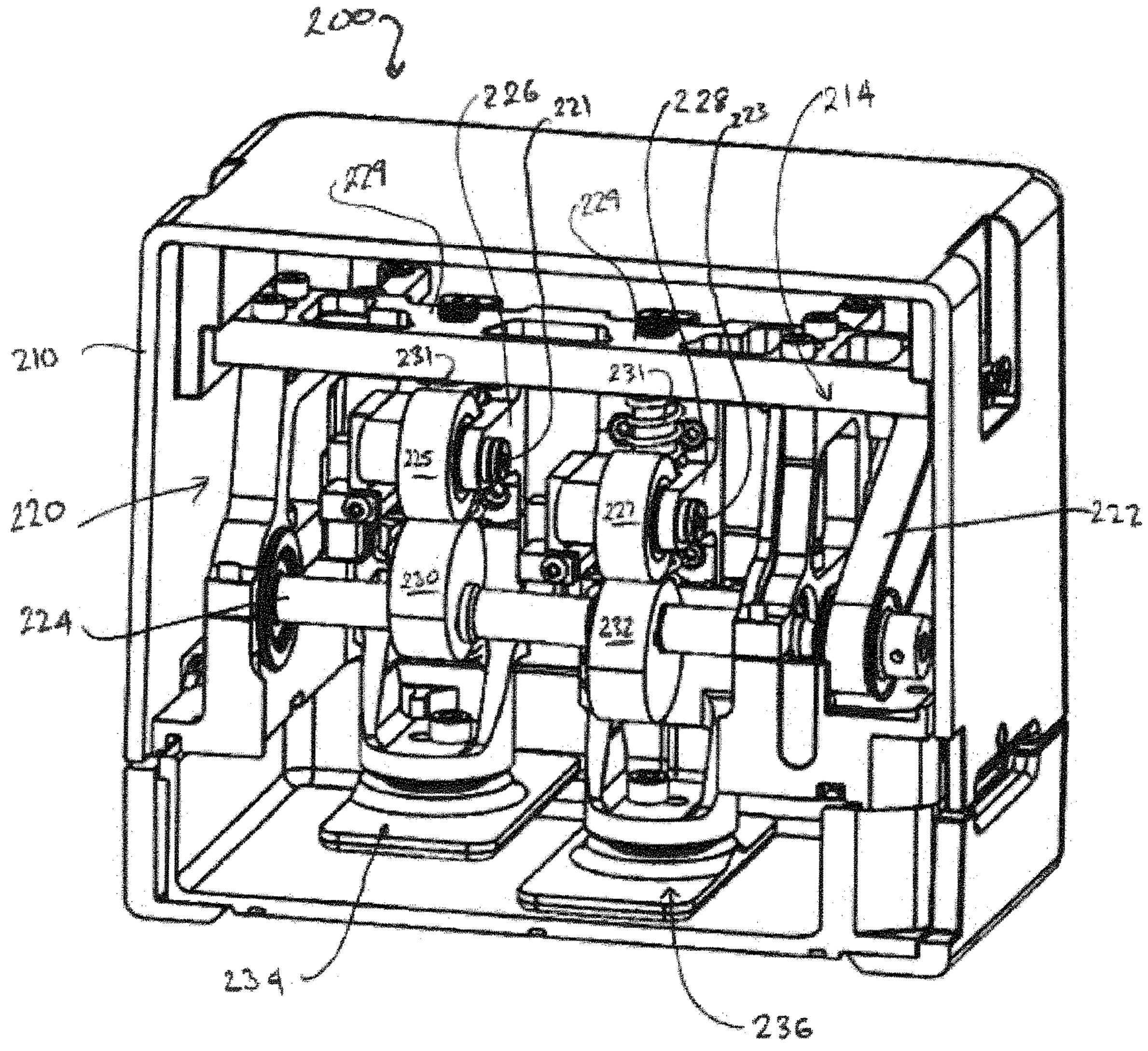
FIG. 1 shows a front view of a treading device apparatus for the disaggregation of tissue into individual cells or cell clumps within a sample container, and which may be used in various embodiments of the present invention.

FIG. 1 shows a front view of a treading device apparatus 200 for the disaggregation of tissue into individual cells or cell clumps within a sample container. The treading device apparatus 200 can be used in various embodiments of the present invention.

In this instance, the sample container comprises an at least initially aseptic generally flat-sided and relatively thin sample processing bag 10. The treading device apparatus 200 includes a housing 210 formed from an assembly of parts that may be removably inserted into a temperature controlled device such as a controlled temperature rate change freezer, thawer or warmer, for example, a commercially available device known as Via Freeze™, which is commercially available from Cytiva™ Life Sciences.

In practice the housing 210 will include a cover, which is not illustrated. In use the treading device apparatus 200 and sample processing bag 10 provide a closed system, for disaggregating tissue therein (e.g. animal or human tissue, needle biopsies etc.). The resulting cell suspension may then be cryopreserved for subsequent analysis without the need to transfer the disaggregated sample out of the sample processing bag 10.

Treading device apparatus 200 comprises a treading mechanism 220. Two treading feet 234, 236 are driven in a cyclic alternate treading motion by a 24 volt DC electric motor 214 which has a rotary encoder providing feedback to a controller for monitoring and controlling the speed of the treading motion. The motor drives a cam shaft 224 via a toothed belt 222. The cam shaft 224 includes a pair of cams 230, 232 offset at 180 degrees, in this instance, each profiled with a cycloidal shape to provide simple harmonic motion of a cam follower. Each cam 230, 232 is operable to move a cam follower assembly including an associated elastomeric follower wheel 225, 227 which rides over the cam profile, and a follower wheel axle 221, 223 in force transmitting relationship with a sprung follower carriage 226, 228.

Each carriage 226, 228 slides in a linear guide 229, and a respective foot 234, 236 is connected to the carriage. Each cam follower assembly is forced upwards in turn by a respective one of the follower wheels as it rides the cam profile away from a treading condition together with the foot, as the respective cam is rotated by the motor against the urging force of a return spring 231. As the cam is rotated further, and the cam profile recedes, the spring 231 associated with each follower assembly forces the assembly and foot downwards to impart a treading force. Thereby, the treading force is limited to the spring rate of the associated follower assembly spring 231, and not the power of the drive motor.

The force applied to the bag is, in use, limited by the springs 231 because the mechanism drives the feet 234, 236 up and the springs push them back down. This makes sure that:

a. the motor cannot stall (regardless of tumour size or texture);
b. the sample is not compressed with excessive force and the bag will not split;
c. the maximum pressure applied to the bag is lower than the pressure tested during bag manufacture; and
d. a hinged bag receiving area can accept a sample bag and any clamp used, without necessarily pre-positioning the feet 234, 236. In other words, the feet 234, 236 can be in any position when accepting a bag 10, because the hinged sample area is closed against the feet 234, 236, and if needed any sample can at that time be compressed by the feet 234, 236 as the hinged area is closed against the feet 234, 236.

Treading device apparatus 200 may further include a flexible sealing membrane extending from a device housing 210 to the upper parts of the two feet 234, 236, which provides a fluid resistant and dust seal between the soles of the feet 234, 236 and the remaining parts of the treading mechanism 220. Such an arrangement inhibits mechanism contamination, should the compressed bag 10 split in service. Whilst use of a membrane is preferred, the feet could slide in seals, such as lipped seals mounted to a partition dividing the mechanism 220 from the bag area, thereby achieving similar inhibition of contamination of the mechanism should that be needed.

Treading device apparatus 200 further includes a heat transfer plate. This heat transfer plate is hinged to one side of the housing 210 at hinge, so that insertion and removal of the bag 10 to be trodden is easier. The heat transfer plate can include a temperature sensor which allows the temperature of the plate and the bag receiving area to be monitored and recorded by the controller, e.g. for quality control.

Each foot 234, 236 is adjustable in height relative to heat transfer plate of the treading device apparatus 200, and an indication of movement is monitored also by the controller. Thus, even though the rotary encoder may indicate that the motor is turning, a mechanical failure, such as a failure of the toothed belt 222, may still be detected by the controller, and a suitable action can be implemented, such as raising an alarm.

The treading device apparatus 200 may further be dimensioned such that the housing 210 can be slid inside a controlled rate freezer (not shown) with a freezer lid in place.

Figure 2A:
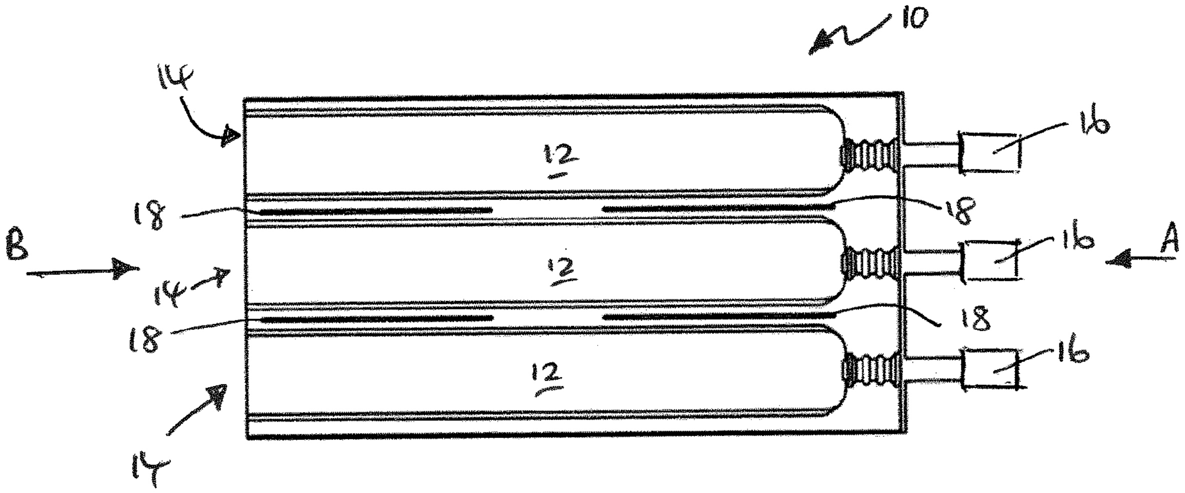
FIGS. 2A to 2C show an embodiment of a sample container for use with the apparatus of FIG. 1.
Figure 2B:
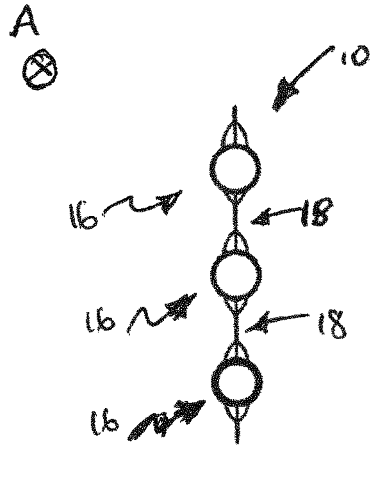
Figure 2C:
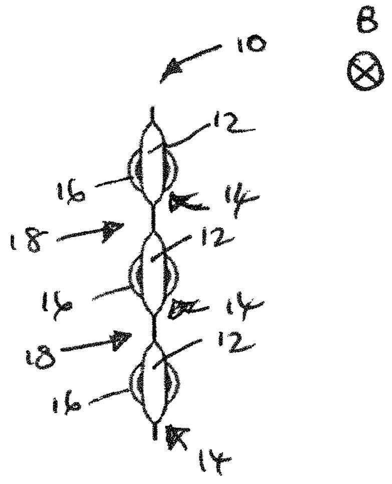

FIGS. 2A to 2C show an embodiment of a sample container for use with the treading device apparatus 200 of FIG. 1. More specifically, the sample container comprises a sample processing bag 10. The sample processing bag 10 comprises a plurality of separate chambers 12 therein. Preferably, the processing bag 10 is made from a polymer material. Advantageously, in various embodiments, the sample processing bag 10 can be heat sealed at various positions with its contents in place.

FIG. 2A shows the sample processing bag 10 in plan view. FIG. 2B shows a view of the sample processing bag 10 when viewed along the direction indicated as A in FIG. 2A. FIG. 2C shows a view of the sample processing bag 10 when viewed along the direction indicated as B in FIG. 2A.

Each chamber 12 is accessible via a respective bag opening 14, and also connects to an access port 16. Preferably, the openings 14 are large enough, e.g. about 10 mm in diameter or larger, to accept a sample which if necessary has been chopped into small pieces and passed into the chambers 12 by means of a syringe. The openings 14 may be heat sealed shut once the samples have been introduced into the respective chambers 12. In use, various materials (e.g. samples, reagents such as a disaggregation enzyme, disaggregated samples etc.) may be inserted into and/or extracted from the chambers 12 via the access ports 16, which access ports 16 further provide a seal when the ports 16 are not in use.

The sample processing bag 10 has a generally flat construction, and may in various embodiments be up to 12 mm thick, with some additional compliance being provided in order to enable tissue samples to fit therein. One construction for a sample processing bag 10 may use two layers of polymer material (e.g. Ethylene-vinyl acetate (EVA)) sealed at respective periphery points around the chambers 12.

In this embodiment, three separate individual chambers 12 are further individually separable from one another by separating the chambers 12 along perforations or pre-cuts 18 that are provided in the polymer material found between the respective chambers 12. For example, pre-cuts 18 may be provided as respective single elongated slits, or as a plurality of substantially co-linear pre-cuts either with or without interspaced perforations therebetween, provided between the chambers 12.

Each chamber 12 may be suitable for processing tissue samples having a mass of up to 1 gm (compared to previous designs for tissue samples up to 16 gm). A minimum chamber minimum volume of only 2 ml may thus be required in each chamber (compared to a minimum of 5 ml in various known systems). Smaller samples requiring smaller amounts of reagents etc., as compared to conventional systems, may thus be processed, requiring smaller initial biopsies or the like and having a lower requirement for consumables.

One further advantage of providing individually separable chambers 12, is that a user may select one or more chambers 12 to use at any particular point when processing the contents thereof. Hence, flexible processing can be provided. Additionally, the contents of each chamber 12 can be processed under substantially the same conditions (temperature, freezing, treading time, etc.), with the chambers 12 then being separable. One or more of the separable chambers may then be processed, stored for future reference, etc. as required, such that a user may be confident that the results of any subsequent processing is based upon substantially identically treated initial samples.

Figure 3:
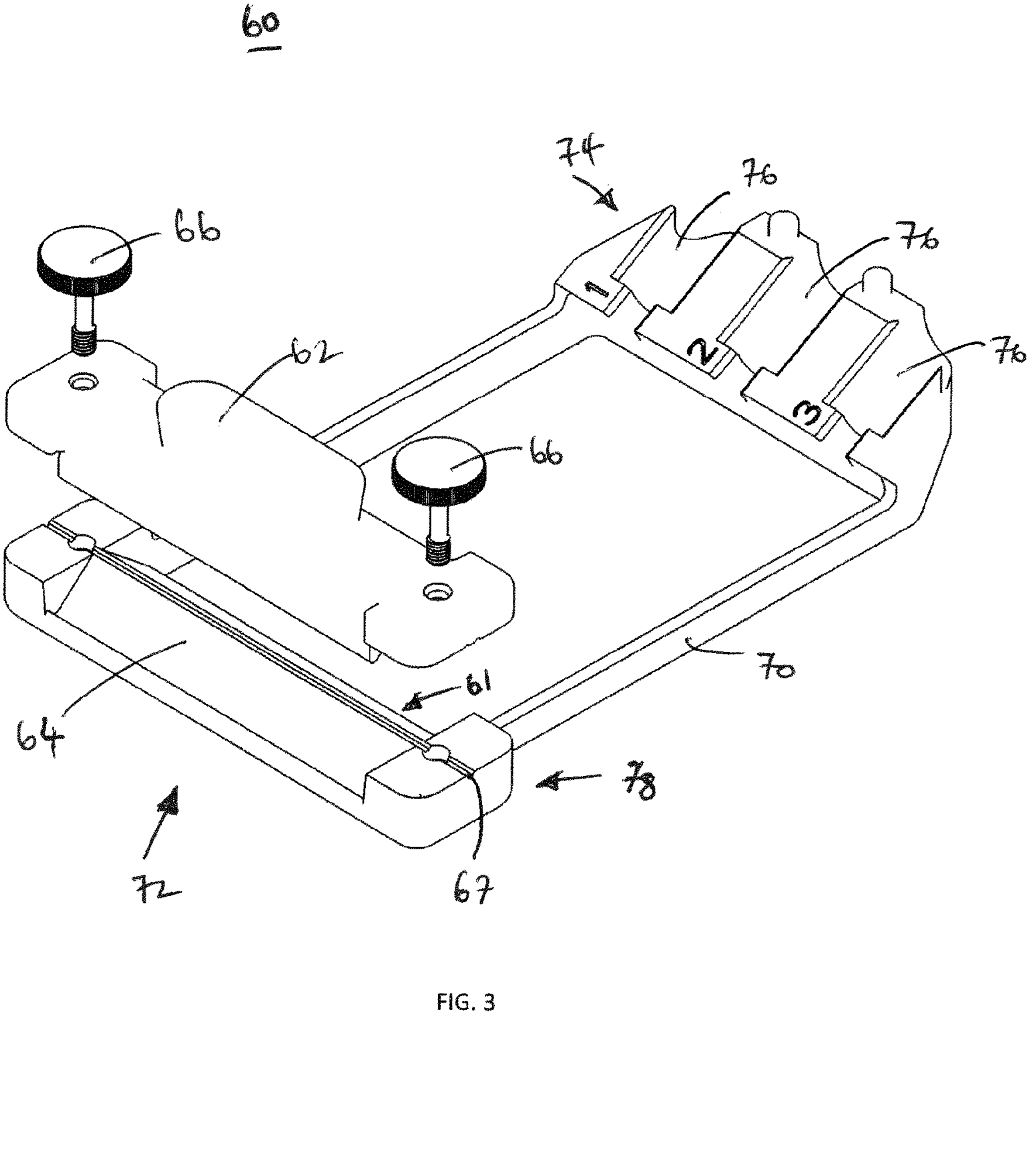
FIG. 3 shows an embodiment of a sample container clamp assembly for use with the treading device apparatus of FIG. 1 and/or the sample container of FIGS. 2A-C.

FIG. 3 shows an embodiment of a sample container clamp assembly 60 for use with the treading device apparatus 200 of FIG. 1 and/or the sample processing bag 10 of FIGS. 2A-C.

The sample processing bag 10 can be clamped in the clamp assembly 60, for example, either before or after heat sealing. Once retained in the clamp assembly 60, the processing bag 10 therein can then be placed into treading device apparatus 200 to allow any tissue therein to be disaggregated. For example, a foot assembly 234, 236 of the treading device apparatus 200 may act on the sample processing bag 10 to disaggregate any tissue therein.

The clamp assembly 60 comprises a base support 70 and a clamp mechanism 72 that are used together to retain the sample processing bag 10 adjacent to the base support 70 during the tissue disaggregation operation. The clamp assembly 60 comprises a top bar 62 and a bottom bar 64 that can be clamped together by a pair of screws 66. The bottom bar 64 is provided at a distal end 78 of the base support 70, and may optionally be formed integrally therewith. As the screws 66 are tightened, the top bar 62 and bottom bar 64 are urged into contact. A portion of the sample processing bag 10 may thereby be retained therebetween.

Additionally, the base support 70 includes a raised end portion 74 for supporting at least one access port 16 of a sample processing bag 10 thereon. In this embodiment, three recessed portions 76 are provided in the raised end portion 74.

Any or all of the base support 70, clamp mechanism 72 and/or screws 66 may be formed from a polymeric material. For example, polyamide may be used. Any or all of such parts may be formed using various techniques, such as for example, using additive manufacturing techniques such as selective laser sintering (SLS), etc.; moulding; casting; machining; etc.

The top bar 62 has a tapering recess (not shown), in which sits a complementary wedge shaped formation 61 when clamped. The recess and wedge concentrate the clamping forces at the apex of the wedge shaped formation 61, providing higher clamping forces at the apex than could be achieved by flat clamping faces. For even more clamping force, the wedge shaped formation 61 also has a small channel 67 at its peak, which is met in use by a complementary ridged formation (not shown), in the top bar 62. The forces may sufficient to negate the need for a heat seal in the sample processing bag 10, although such a heat seal may be provided for extra security. The clamping force is further enhanced by the thickness and stiffness of the top 62 and bottom 64 bars which do not readily bend, and so maintain the clamping force exerted by the screws 66.

In use, the sample processing bag 10 can be placed into the clamp assembly 60 and then slid into place in the receiving area in the treading device apparatus 200, such that it sits under the two feet 234, 236. The sealed sample processing bag 10 may be provided with tissue that is suspended in an aqueous solution, which may itself contain digestive enzymes such as collagenases and proteases to accelerate the breakdown of the tissue which was previously introduced into the sample processing bag 10 via an opening 14.

The sample processing bag 10 may be placed adjacent to the heat transfer plate and warmed from, for example, an external heat source to approximately 35° C. to accelerate the rate of tissue digestion. Moreover, a single sample processing bag 10 may be employed, and digestive enzymes can be introduced through one or more of the ports 16 in the sample processing bag 10 prior to or during disaggregation, as required.

The heat transfer plate may be used to introduce heat energy into the sample processing bag 10 by heating the heat transfer plate on its underside to provide the desired temperature in the sample processing bag 10 for enzymatic action. That heat could conveniently come from an electrically heated warming plate, or electric heating elements in or on the heat transfer plate.

The amount of disaggregation action will depend on numerous parameters, for example the size, density and elasticity of the initial tissue sample, and so the time for disaggregation and the rate of treading will vary significantly. Too long or overly vigorous treading could lead to decreased cell viability. Thus, the motor unit speed and the disaggregation period may be controlled.

One option is to time the processing according to a look-up table which includes times and output speeds required to disaggregate similar samples. Another option is to measure the instantaneous electrical power or electrical energy over time needed to perform the disaggregation processing, or to measure the force or stress exerted on the heat transfer plate or another part of the mechanism, and to stop after a predetermined threshold has been reached, to indicate that the sample has been sufficiently disaggregated. As the power/forces/stresses reduce the disaggregation is closer to completion.

Another option is to measure light absorbance through the sample processing bag 10: the greater the absorbance, the closer the sample is to complete disaggregation. Once disaggregation is complete, the sample processing bag 10 contents can be transferred, and the cells or other constituents of interest can be separated and put back into a fresh sample processing bag 10 for freezing in the treading device apparatus 200. Alternatively, the whole of the disaggregated materials can be left in the sample processing bag 10 and then subsequently be frozen (either in one or more individual chambers 12). A cryoprotectant may thus be introduced into the bag through a port 16 for those chambers which are to be subject to freezing.

To control the formation of ice and prevent supercooling of the sample, while the sample processing bag 10 is being cooled, the sample processing bag 10 can be massaged by the feet 234, 236, in the manner described above, albeit at a slower rate than for disaggregation, so as to control ice nucleation and thereby increase the viability of the cells after thawing.

When required for use, the frozen disaggregated samples in a sample processing bag 10 can be thawed rapidly in the treading device apparatus 200 by further external heating of the heat transfer plate, and/or by partially immersing the treading device apparatus 200 in a warmed water bath, maintained at about 37° C., and the cryoprotectant then removed. In each case the sample processing bag 10 can be massaged during thawing. If the enzymes are still present, they too can be removed if needed, for example by means of filtering. Generally, they will have had little or no effect on the cells during cryopreservation because their action is halted at low temperatures.

All the process manipulations, warming, disaggregation, cooling, freezing and then thawing occur with the sample in the same sealed sample processing bag 10, and may be performed in a single device. This is not only time and space efficient, but it enables a single record to capture everything that happened to the sample during processing, e.g. temperatures, durations, disaggregation speed, freezing protocol, and lessens the chance for errors, such as a sample spending too much time in an uncontrolled environment between processing machines.

Moreover, since the sample processing bag 10 is mounted upon a clamp assembly 60, it is also readily removeable from the treading device apparatus 200, such that sample handling and cleaning after use of the treading device apparatus 200 is made easier.

Figure 4A:
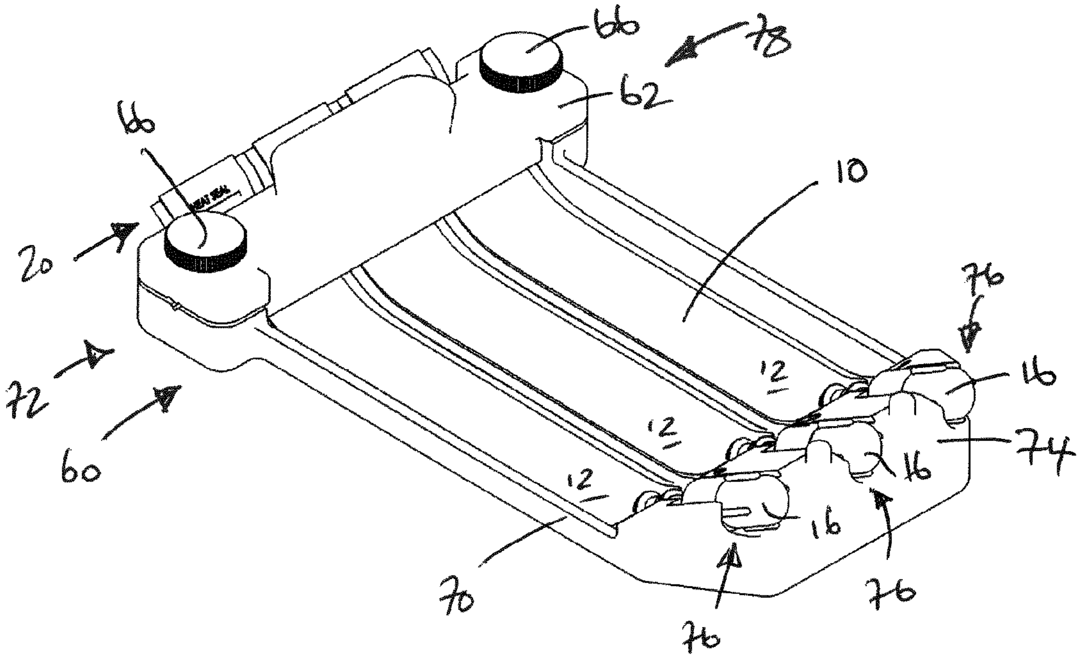
FIGS. 4A and 4B shows a sample processing bag retained by a clamp assembly in accordance with various embodiments of the present invention.
Figure 4B:
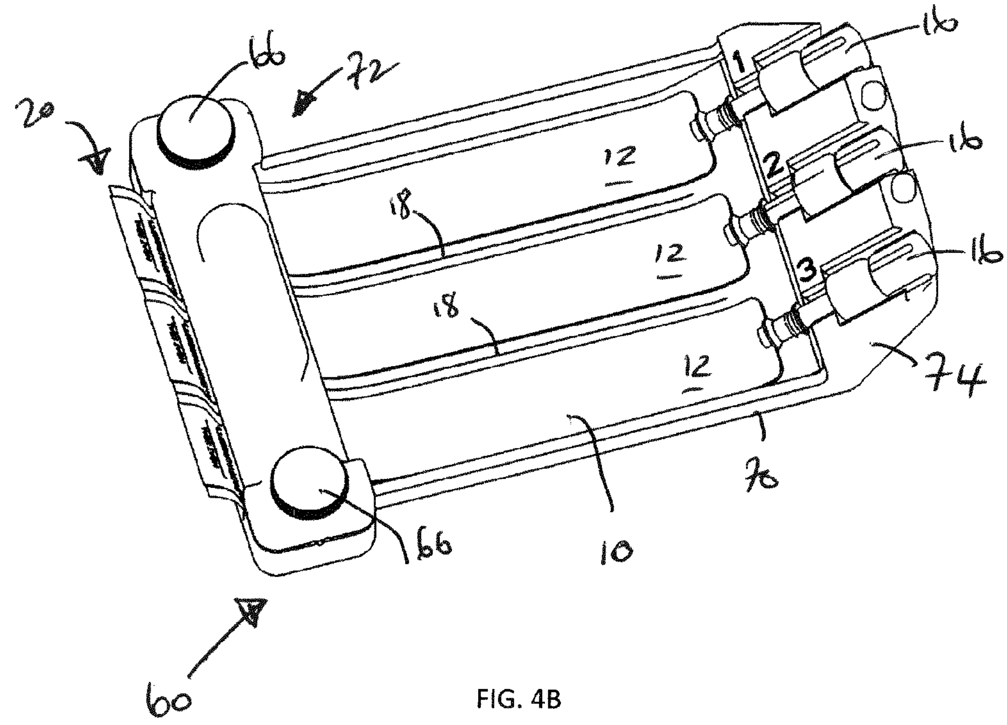

FIGS. 4A and 4B show a sample processing bag 10 retained by a clamp assembly 60 in accordance with various embodiments of the present invention.

The sample processing bag 10 has been heat sealed at an end 20 thereof after respective samples have been added into respective chambers 12 via the openings 14. In this instance, the sample processing bag 10 comprises three chambers 12 that are separated by respective pre-cuts 18 that extend between the chambers 12 substantially along the whole length thereof.

Once heat sealed, the sample processing bag 10 is clamped adjacent the end 20 at a distal end 78 of the base support 70. The sample processing bag 10 is retained in a cavity formed in the base support 70 of the clamp assembly 60, and the clamp mechanism 72 is used to secure the sample processing bag 10 towards the distal end 78. Respective ports 16 of the sample processing bag 10 are then placed into respective recessed portions 76 provided in a raised end portion 74 of the base support 70.

A sealed sample processing bag 10 may thus be retained in the clamp assembly 60, and the two together can be easily transported, stored and/or inserted into the treading device apparatus 200. Additionally, individual of the chambers 12 may be easily separated from one another, having previously together been subject to substantially the same processing conditions.

Various aspects and embodiments of the present invention have thus been described. However, the invention is not to be seen as limited by the embodiments described above, but can be varied within the scope of the appended claims as would be readily apparent to the person skilled in the art.

For example, whilst the embodiments herein described depict a base support including a raised end portion for supporting at least one access port of a sample processing bag thereon, those skilled in the art would understand that alternative variants would be possible. For example, a substantially planar base support structure may be provided having one or more clips supported thereon for engaging respective ports therein. Many other possible modifications would also be apparent to the skilled person.

The invention claimed is:

1. A treading device apparatus for disaggregation of tissue within a sample processing bag, comprising:

at least one foot assembly for treading a sample processing bag; and a clamp assembly releasably couplable to the treading device apparatus, said clamp assembly comprising a base support and a clamp mechanism configured to retain the sample processing bag adjacent to the base support during a tissue disaggregation operation such that said at least one foot assembly acts on the sample processing bag to disaggregate any tissue therein;

wherein the sample processing bag has a plurality of separate chambers therein, each chamber being accessible via a respective opening and/or access port.

2. The treading device apparatus of claim 1, comprising a receiving area provided at a bottom of a chassis thereof comprising a support plate for supporting the base support of the clamp assembly adjacent thereto.

3. The treading device apparatus of claim 2, wherein the support plate comprises a heat transfer plate.

4. The treading device apparatus of claim 3, further operable to control the temperature of the heat transfer plate to heat and/or cool said clamp assembly.

5. The treading device apparatus of claim 1, wherein the bag chambers are separable.

6. The treading device apparatus of claim 5, wherein the respective bag chambers are interspaced by a perforated and/or pre-cut polymer material provided therebetween.

7. The treading device apparatus of claim 1, wherein the sample processing bag comprises three bag chambers.

8. A clamp assembly for the treading device apparatus for disaggregation of tissue within a sample container of claim 1, the clamp assembly comprising a base support and a clamp mechanism configured to retain a sample processing bag adjacent to the base support.

9. The clamp assembly of claim 8, wherein the base support includes a raised end portion for supporting at least one access port of a sample processing bag thereon.

10. The clamp assembly of claim 9, wherein the raised end portion comprises at least one recessed portion therein.

11. The clamp assembly of claim 8, wherein the clamp mechanism is provided at a distal end of the base support.

12. A sample processing bag for use in a treading device apparatus according to claim 1, said sample processing bag comprising a plurality of separate chambers therein, and wherein each chamber is accessible via a respective opening and access port connected thereto.

13. The sample processing bag of claim 12, wherein the openings are heat-sealable.

14. The sample processing bag of claim 12, wherein the bag chambers are separable, optionally by separating the chambers along perforations and/or pre-cuts provided in a polymer material interspaced therebetween.

15. The sample processing bag of claim 12, wherein the sample processing bag comprises three bag chambers.

16. The sample processing bag of claim 12, wherein the sample processing bag is sterile.

17. The sample processing bag of claim 12, comprising two layers of polymer material sealed at respective periphery points around the chambers thereof.

18. The sample processing bag of claim 17, wherein the polymer material comprises Ethylene-vinyl acetate (EVA).

19. The sample processing bag of claim 12, configured to be used for cryopreservation of disaggregated tissue.

* * * * *